(12) United States Patent
Benbouzid et al.

(10) Patent No.: US 9,293,971 B2
(45) Date of Patent: Mar. 22, 2016

(54) ACTIVE MAGNETIC BEARINGS CONTROL SYSTEM

(71) Applicant: SKF Magnetic Mechatronics, Saint-Marcel (FR)

(72) Inventors: Salim Benbouzid, Eaubonne (FR); Joaquim Da Silva, Sennely (PT); Jean Levine, Paris (FR); Stephane Turpault, Paris (FR)

(73) Assignee: SKF MAGNETIC MECHATRONICS, Saint-Marcel (FR)

( * ) Notice: Subject to any disclaimer, the term of this patent is extended or adjusted under 35 U.S.C. 154(b) by 75 days.

(21) Appl. No.: 14/319,700

(22) Filed: Jun. 30, 2014

(65) Prior Publication Data

US 2015/0002000 A1 Jan. 1, 2015

(30) Foreign Application Priority Data

Jun. 28, 2013 (EP) .................................... 13305921

(51) Int. Cl.
| | |
|---|---|
| G05D 23/275 | (2006.01) |
| H02K 11/00 | (2006.01) |
| H02P 31/00 | (2006.01) |
| F16C 32/04 | (2006.01) |

(52) U.S. Cl.
CPC ........ *H02K 11/0073* (2013.01); *F16C 32/0451* (2013.01); *H02P 31/00* (2013.01); *F16C 32/0444* (2013.01); *F16C 32/0446* (2013.01); *H02P 2203/00* (2013.01)

(58) Field of Classification Search
CPC . H02K 11/0073; H02P 31/00; F16C 32/0446; F16C 32/0444; F16C 32/044; F16C 32/0459; F16C 32/0474
USPC ........................................ 318/632; 310/68 B
See application file for complete search history.

(56) References Cited

U.S. PATENT DOCUMENTS

| | | |
|---|---|---|
| 5,814,774 A | 9/1998 | Remmers et al. |
| 6,515,387 B1 | 2/2003 | Shinozaki |
| 2004/0257023 A1* | 12/2004 | Tamisier ............. F16C 32/0451 318/632 |

FOREIGN PATENT DOCUMENTS

| | | |
|---|---|---|
| DE | 102006062420 A1 | 12/2007 |
| JP | 2013079678 A | 5/2013 |

OTHER PUBLICATIONS

Stephane Turpault et al: "Modeling and Motion Planning of the Magnetic Vector Potential in a Nonlaminated Active Thrust Bearing System," ISBM13; 13th International Symposium on Magnetic Bearings; Arlington, Virginia, USA, Aug. 6-8, 2012, pp. 66/1-66/15.
Vischer D et al: "A New Approach to Sensorless and Voltage Controlled AMBS Based on Netowrk Theory Concepts," Proceedings of the International Symposium on Magnetic Bearings, Jul. 12, 1990, pp. 301-306.

* cited by examiner

*Primary Examiner* — Bentsu Ro
*Assistant Examiner* — Zemenay Truneh
(74) *Attorney, Agent, or Firm* — Bryan Peckjian; SKF USA Inc. Patent Dept.

(57) ABSTRACT

A control device for controlling the position of a rotor supported by active magnetic bearings is provided. The control device includes a trajectory planning module for generating a requested position, speed and acceleration; a feedback unit for generating a position feedback value and a speed feedback value; a first correction circuit for generating a first command signal according to the difference between the requested position and speed and the position and speed feedback value respectively; a feed-forward controller for generating a second command signal; an adder for adding first and second command signals and delivering a third command signal for a non-linear inversion circuit connected to the adder for generating flux command signals for the electromagnets, and a second correction circuit for generating voltage command signals for the power amplifiers which control the current flowing in the electromagnet coils of the active magnetic bearings.

6 Claims, 3 Drawing Sheets

ACTIVE MAGNETIC BEARINGS CONTROL SYSTEM

CROSS-REFERENCE TO RELATED APPLICATIONS

This application claims priority to European Patent Application No. EP13305921.2 filed Jun. 28, 2013, the contents of which are hereby fully incorporated by reference.

TECHNICAL FIELD

The present invention relates to magnetic bearings and more particularly to an axial magnetic bearing having improved dynamic performances due to a motion planning control.

BACKGROUND

Magnetic bearings are used in different rotating machines such as electric motors, compressor, turbines or the like in order to maintain the axial or/and radial positions of a rotating shaft by means of magnetic fields acting on a rotor of the machine.

Axial magnetic bearings are often used to reject axial disturbances coming from the industrial environment (pressure waves and oscillations) that can create unwanted effects on the behaviour of the rotor of the turbine or the compressor such that limit cycles, vibrations, instabilities.

The axial bearing force is built using a pair of electromagnets connected to power amplifiers (classically one power amplifier per electromagnet) for which the control voltage is adapted by a controller. However, the unlaminated nature (an unlaminated bearing contributes to the eddy currents creation) of the thrust magnetic bearing limits the controller action. The dynamic of the actuator is considerably reduced (an axial bearing cannot reject disturbances located outside of a specific bandwidth frequencies) and the iron losses are increased.

So, as a known solution, when it is possible, the axial bearing design is changed (introduction of slots or use of a laminated design) to break or at least limit the eddy current creation and to reduce losses. Other solutions based on using specific material, for example insert made of ferromagnetic powder, are also identified.

However, all of those known solutions cannot be generalized because they are expensive and increase the magnetic bearing cost. Moreover, they cannot be used for each bearing due to mechanical limitations such as reduction of the mechanical resistance or reduction of the available force for example.

SUMMARY OF THE INVENTION

The present invention aims to eliminate the above disadvantages by dealing with the eddy current using a motion planning control (flatness based control) preferably without changing the hardware or the magnetic bearing design. With this solution we also minimize the losses.

For this, the control device for controlling the position of a rotor supported by active magnetic bearings supplied through power amplifiers whose outputs are connected to electromagnet coils of the active magnetic bearings, according to the invention is of the type comprising:

- a trajectory planning module for generating a requested position, speed and acceleration,
- a feedback unit for generating a position feedback value and a speed feedback value from measurements of at least a position $Z(t)$ of the rotor and current intensities $I_1(t), I_2(t)$ in the electromagnet coils,
- a first correction circuit connected to the trajectory planning module and to the feedback unit for generating a first command signal $\ddot{Z}_{feedback}(t)$ according to the difference between the requested position and speed and the position and speed feedback value respectively,
- a feedforward controller connected to the trajectory planning module for generating a second command signal $\ddot{Z}_{feedback}(t)$ according to a computation of the requested position, speed and acceleration,
- an adder connected to the feedforward controller and to the first correction circuit for adding the first and second command signals and delivering a third command signal $\ddot{Z}_{com}(t)$,
- a non-linear inversion circuit connected to the adder for generating flux command signals $\Phi_{1com}(t), \Phi_{2com}(t)$ for the electromagnets from the third command signal, and
- a second correction circuit connected to the non-linear inversion circuit and to the feedback unit for generating voltage command signals $U_{1com}(t), U_{2com}(t)$ for the power amplifiers which control the current flowing in the electromagnet coils of the active magnetic bearings according to the difference between the flux command signals and feedback flux values $\Phi_{1com}(t), \Phi_{2com}(t)$.

According to another feature of the invention, the feedback position and speed values are observed position $\hat{Z}(t)$ and observed speed $\hat{\dot{Z}}(t)$ delivered by an observer receiving at least the measured position $Z(t)$ issued by position sensors and the current intensities $I_1(t), I_2(t)$ issued by current sensing elements. The observer can further receive measured voltages $U_1(t), U_2(t)$ applied to the electromagnet coils or measured flux obtained from flux sensing elements and delivers observed flux for the second correction circuit.

Preferably, the first correction circuit comprises a proportional-integral controller on the position of the rotor and a proportional controller on the speed of the rotor and the second correction circuit comprises a proportional controller on the flux of the electromagnet coils.

Advantageously, the trajectory planning module further delivers a requested acceleration.

BRIEF DESCRIPTION OF THE DRAWINGS

The invention will be better understood and further details and advantages thereof will appear more clearly in the following description with reference to the accompanying drawings illustrating embodiments of the invention, and in which.

DETAILED DESCRIPTION

Figure 1:
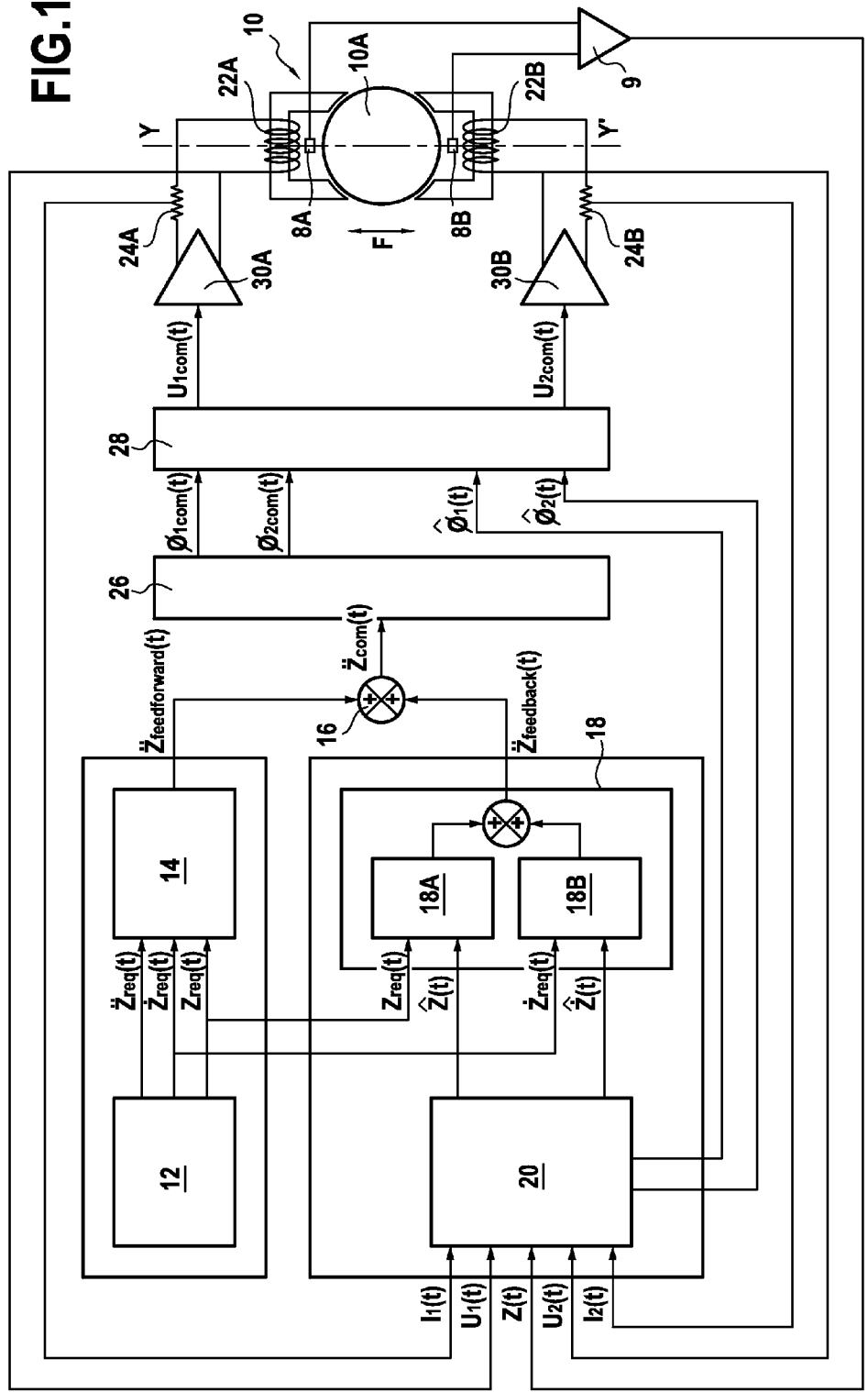
FIG. 1 illustrates a schematic diagram of a control device of the position of a rotor of an active magnetic bearing according to the invention.

FIG. 1 shows a block diagram of a control device according to the invention for controlling the position of a rotor 10A supported by an active magnetic bearing (thrust bearing 10) along a predetermined axis Y-Y'.

The set point (i.e. the desired position) constitutes the input of a trajectory planning module 12 which delivers requested position $Z_{req}(t)$, requested speed $\dot{Z}_{req}(t)$ and requested acceleration $\ddot{Z}_{req}(t)$ for a feedforward generation circuit 14 which delivers a feedforwarded acceleration signal $\ddot{Z}_{feedforward}(t)$.

The feedforwarded acceleration signal $\ddot{Z}_{feedforward}(t)$.is applied to the first input of an adder 16 which receives on a second input a feedback acceleration signal $\ddot{Z}_{feedforward}(t)$ from a correction circuit 18.

The correction circuit comprises a proportional-integral (PI) controller 18A receiving the requested position $Z_{req}(t)$ from the trajectory planning module 12 and an observed position $\hat{Z}(t)$ and a proportional controller 18B receiving the requested speed $\dot{Z}_{req}(t)$ from the trajectory planning module 12 and an observed speed $\hat{\dot{Z}}(t)$. The created $\ddot{Z}_{feedforward}(t)$ is the sum of 18A and 18B outputs.

The observed position and speed are delivered by an observer 20 which receives different measurements from different sensors. More particularly, the observer receives a measured position of the rotor Z(t) from detectors of the rotor position (position sensors 8A, 8B; 9) located along the Y-Y' axis, measured currents $I_1(t)$, $I_2(t)$ in first and second coils 22A, 22B of an electromagnet of the active magnetic bearing from current sensing elements 24A, 24B and measured voltages $U_1(t)$, $U_2(t)$ at the first and second coils 22A, 22B. However, it can be noted that only the measured position and the measured currents are necessary for the observer 20 which can reconstruct the speed from these two measurements and compute the feedback. On the contrary, the availability of the measured voltages is not necessary (they can be estimated from the command U1com and U2com instead) or can be substituted by measured flux obtained from flux sensing elements (not shown).

The feedforwarded acceleration signal $\ddot{Z}_{feedforward}(t)$ and the feedback acceleration signal $\ddot{Z}_{feedforward}(t)$ are added in the adder 16 for delivering a rotor acceleration command $\ddot{Z}_{com}(t)$ applied to a nonlinear inversion circuit 26 which delivers flux command signals $\Phi_{1com}(t)$, $\Phi_{2com}(t)$ for two inputs of a flux proportional controller 28 which also receives on two other inputs observed flux $\widehat{\Phi_1}(t)$, $\widehat{\Phi_2}(t)$ in the first and second electromagnet from the observer 20. The flux proportional controller 28 outputs the voltage commands $U_{1com}(t)$, $U_{2com}(t)$ for the power amplifiers 30A, 30B.

With the invention, the command signal (rotor acceleration command $\ddot{Z}_{com}(t)$) is the sum of a feedback term and another term (named motion planning control) where an anticipated dynamic control is computed from a realistic desired dynamic. The feedback term can be computed with a linear controller such a PID or a state feedback control. This feedback term tries to follow the trajectory planning instead of the final value of the set point. The motion planning control term is an anticipated control which generates a dynamic command corresponding to a desired trajectory. More particularly, the motion planning control term can be adapted with respect to some constraints, such as the minimization of the eddy current for example, and the limitations of the system (amplifiers+actuators+rotor) could be easily implemented in the motion planning control term.

The trajectory can be built for the prescribed magnetic bearing force, the magnetic flux in the bearing, the current in the assembly (i.e. amplifier+electromagnet), the axial motion of the rotor.

Figure 2:
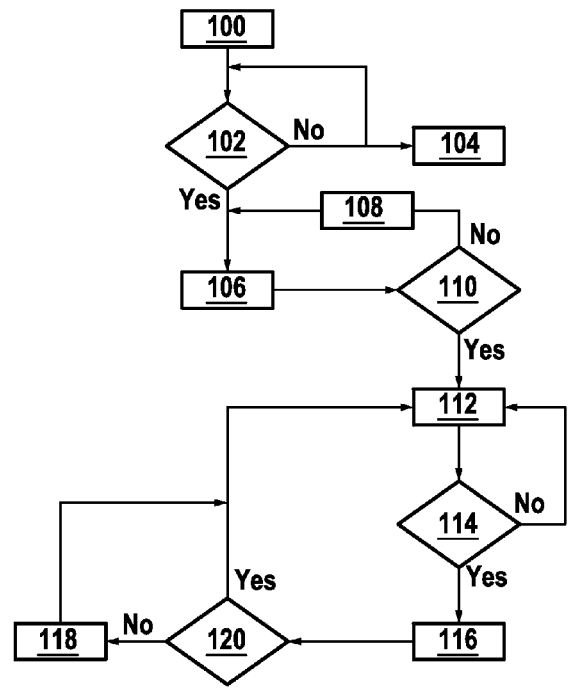
FIG. 2 shows a flow chart of the successive steps executed by a trajectory planning module of FIG. 1.

The trajectory computed by the trajectory planning module will be used for two reasons, as illustrated in the flow chart of FIG. 2, the settling position trajectory at the start-up of the system and the trajectories of return to nominal position when big disturbances move the rotor above a maximum position error.

Indeed, after a first step of initialisation 100, a test 102 of convergence of the observers is made. If a negative response results from this test, an alarm 104 is set on and the test is pursued. On the contrary, if a positive response to this test is obtained the voltage commands $U_{1com}(t)$, $U_{2com}(t)$ for the power amplifiers are created (i.e. setting trajectory in a step 106) and an alarm is set on (step 108) as long as $Z \ne Z_{req}$ (test of step 110). When $Z \approx Z_{req}$ (response YES at the test of step 110), the position Z is read in a further step 112 as long as this position is below a maximum position error (response NO at the test of step 114). On the contrary, when the position Z is above the maximum position error (response YES at the test of step 114), the voltage commands $U_{1com}(t)$, $U_{2com}(t)$ for the power amplifiers are created (i.e. rejection trajectory in a step 116) and an alarm is set on (step 118) as long as $Z \ne Z_{req}$ before to return to the step 112 of reading of the Z position.

For a better understanding of the invention, results of tests which show the comparison of the behaviour of a classical biased control (PID controller) and the control according of the invention during the starting phase of the control of the position of an axial active magnetic bearing are illustrated on FIGS. 3 to 8. It must be noticed that the current in the amplifiers is limited to only positive values. So the negative value of voltage can only command the rate current decrease: a maintained negative voltage leads to null current. The axial position of the thrust disc attached on the rotor of the axial magnetic bearing is set from the initial position to the nominal position.

Figure 3:
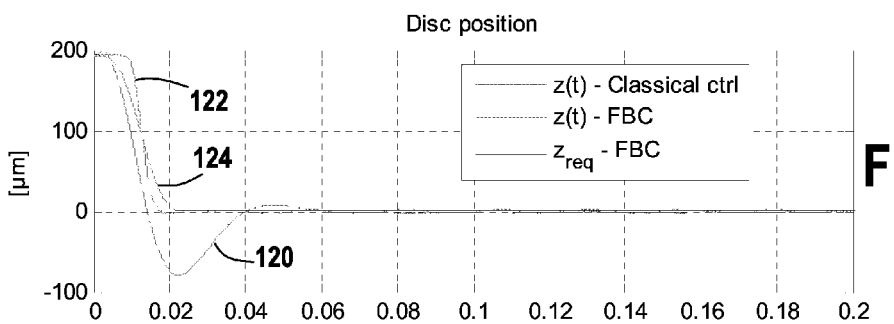
FIGS. 3 and 4 represents the position and the speed of the thrust disc of an axial magnetic bearing for a classical biased control or a control according to the invention respectively.

FIG. 3 represents the position of the thrust disc Z(t) with a classical control 120 and a control according to the invention 122. The third curve 124 illustrates $Z_{req}(t)$ with the control according to the invention. Due to the flatness nature of the curves in opposition to the classical shape, the control according to the invention is named by the inventors as a flatness-based control (FBC).

Figure 4:
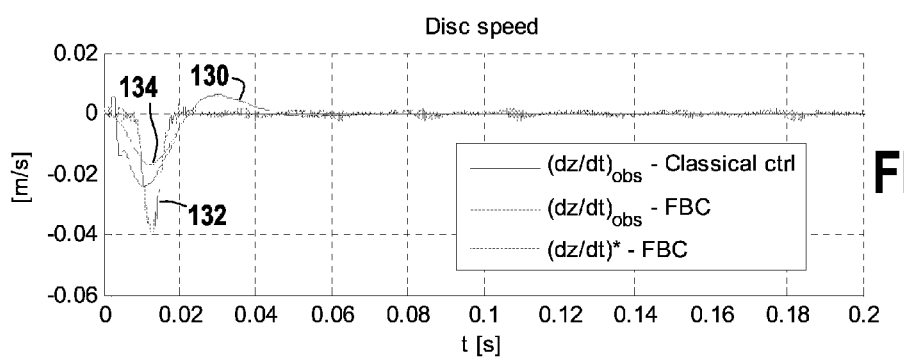

FIG. 4 represents the speed of the thrust disc with a classical control 130 and a control according to the invention 132. The third curve 134 illustrates the observed speed $\hat{\dot{Z}}(t)$ with the control according to the invention.

Figure 5:
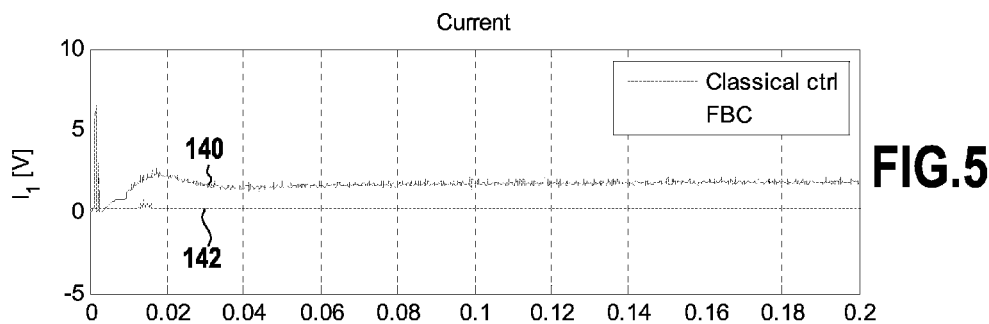
FIGS. 5 and 6 represents the current intensity in each electromagnet of an axial magnetic bearing for a classical biased control or a control according to the invention respectively.
Figure 6:
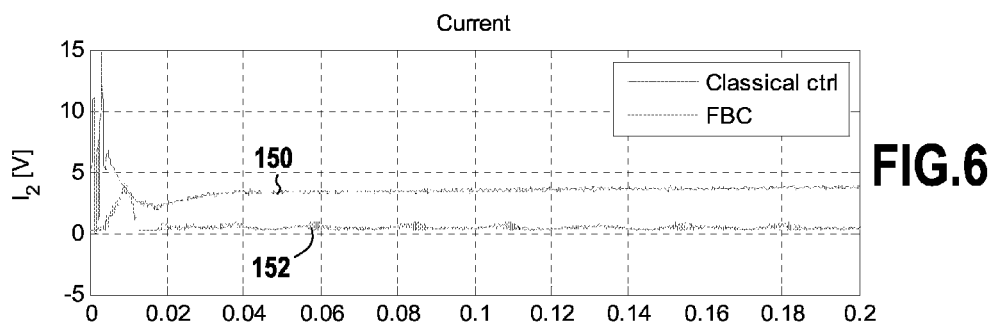

FIG. 5 represents the current intensity $I_1(t)$ in the first electromagnet with a classical control 140 and a control according to the invention 142 and FIG. 6 the current intensity $I_2(t)$ in the second electromagnet with a classical control 150 and a control according to the invention 152.

Figure 7:
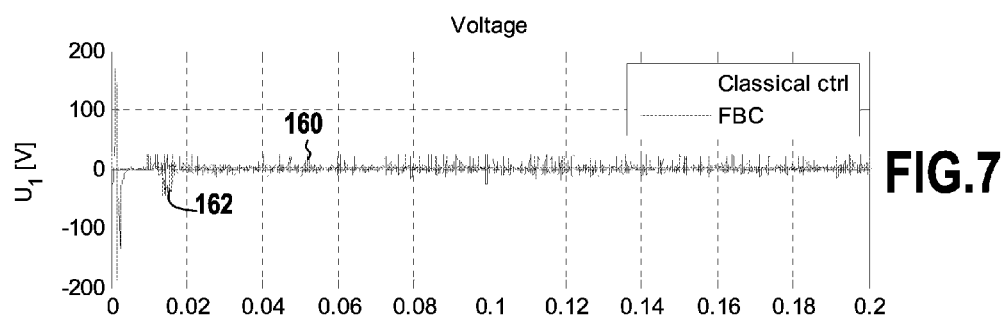
FIGS. 7 and 8 represents the voltage applied to each electromagnet of an axial magnetic bearing for a classical biased control or a control according to the invention respectively.
Figure 8:
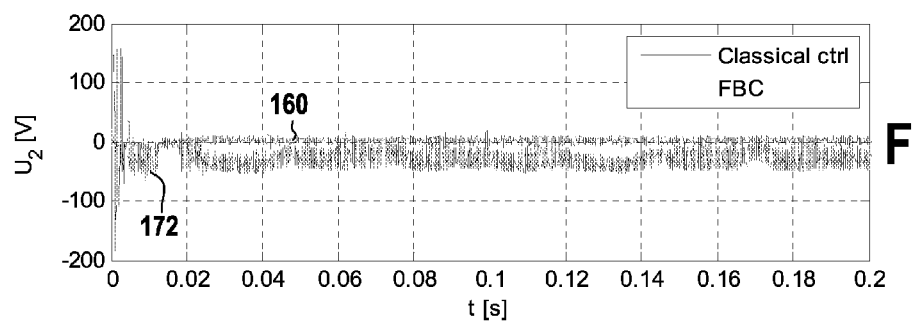

FIG. 7 represents the voltage $U_1(t)$ applied to the first electromagnet with a classical control 160 and a control according to the invention 162 and FIG. 8 the voltage $U_2(t)$ applied to the second electromagnet with a classical control 170 and a control according to the invention 172.

The present invention comprises a plurality of advantages, i.e.:

The possibility to control the magnetic thrust bearing without bias (flux/current) such that the energy consumed using this controller can be much lower than controllers with a classical biased control, The possibility to easily perform a control with good performances not only at the nominal position but at any position in the air gap, The possibility for the rotor to follow any reachable position trajectory differentiable enough within the air gap, and The possibility to take into account the physics limitations of the system without compromise on the controller (feedback control term).

The invention is particularly suitable for axial magnetic bearings of important machines like chiller or turbo-expander for example as for axial magnetic bearings within smaller systems like HVAC for cars or trucks.

Although preferred embodiments have been shown and described, it should be noted that any changes and modifications may be made therein without departing from the scope of the invention as defined in the appended claims. For example, if the control circuit has been explained with one pair of opposite electromagnets, it is clear that it is generalized to four pairs of electromagnet.

The invention claimed is:

1. A control device for controlling the position of a rotor supported by active magnetic bearings supplied through power amplifiers whose outputs are connected to electromagnet coils of the active magnetic bearings, the control device comprising:
   a trajectory planning module for generating a requested position and a speed,
   a feedback unit for generating a position feedback value and a speed feedback value from measurements of at least a position ($Z(t)$) of the rotor and current intensities ($I_1(t)$, $I_2(t)$) in the electromagnet coils,
   a first correction circuit connected to the trajectory planning module and to the feedback unit for generating a first command signal ($\ddot{Z}_{feedforward}(t)$) according to the difference between the requested position and speed and the position and speed feedback value respectively,
   a feedforward controller connected to the trajectory planning module for generating a second command signal ($\ddot{Z}_{feedforward}(t)$) according to a computation of the requested position and a speed,
   an adder connected to the feedforward controller and to the first correction circuit for adding the first and second command signals and delivering a third command signal ($\ddot{Z}_{com}(t)$),
   a non-linear inversion circuit connected to the adder for generating flux command signals ($\Phi_{1com}(t)$, $\Phi_{2com}(t)$) for the electromagnet coils from the third command signal, and
   a second correction circuit connected to the non-linear inversion circuit and to the feedback unit for generating voltage command signals ($U_{1com}(t)$, $U_{2com}(t)$) for the power amplifiers which control the current flowing in the electromagnet coils of the active magnetic bearings according to the difference between the flux command signals and feedback flux values ($\Phi_{1com}(t)$, $\Phi_{2com}(t)$).

2. The device of claim 1, wherein the feedback position and speed values are observed position $\hat{Z}(t)$ and observed speed $\dot{\hat{Z}}(t)$ delivered by an observer receiving at least the measured position $Z(t)$ issued by position sensors (8A, 8B; 9) and the current intensities ($I_1(t)$, $I_2(t)$) issued by current sensing elements.

3. The device of claim 2, wherein the observer further receives measured voltages ($U_1(t)$, $U_2(t)$) applied to the electromagnet coils or measured flux obtained from flux sensing elements and delivers observed flux for the second correction circuit.

4. The device of claim 1, wherein the first correction circuit comprises a proportional-integral controller on the position of the rotor and a proportional controller on the speed of the rotor.

5. The device of claim 1, wherein the second correction circuit comprises a proportional controller on the flux of the electromagnet coils.

6. The device of claim 1, wherein the trajectory planning module further delivers a requested acceleration.

* * * * *